United States Patent [19]

Hamada

[11] 4,330,565
[45] May 18, 1982

[54] PROCESS FOR PRODUCING FRUIT EXTRACTS

[75] Inventor: Akiko Hamada, Tokyo, Japan

[73] Assignee: Japan (Impex) Limited, Tokyo, Japan

[21] Appl. No.: 909,175

[22] Filed: May 24, 1978

[30] Foreign Application Priority Data

Sep. 28, 1977 [JP] Japan ................................ 52/115628

[51] Int. Cl.³ .......................... A23L 2/02; A23L 2/04
[52] U.S. Cl. ................................... 426/431; 426/599; 426/489; 426/506
[58] Field of Search ............... 426/489, 506, 431, 599, 426/655; 99/467, 470, 536, 294, 288, 293, 300

[56] References Cited

U.S. PATENT DOCUMENTS

| 1,235,791 | 8/1917 | Gebhardt et al. | 99/293 |
| 1,393,422 | 10/1921 | Berridge | 426/655 |
| 1,890,475 | 12/1932 | Todd | 426/431 |
| 2,942,985 | 6/1960 | Stewart, Jr. | 426/655 |
| 3,150,981 | 9/1964 | Redd | 426/431 |
| 3,169,873 | 2/1965 | Clark et al. | 426/431 |
| 3,211,557 | 10/1965 | Nury et al. | 426/431 |
| 3,385,711 | 5/1968 | Sperti | 426/431 |
| 3,495,522 | 2/1970 | Muller | 99/470 |
| 3,711,294 | 1/1973 | Atkins et al. | 426/599 |

FOREIGN PATENT DOCUMENTS 401379 3/1974 U.S.S.R. .............................. 426/431

Primary Examiner—Marc S. Alvo
Attorney, Agent, or Firm—Edward A. Sokolski

[57] ABSTRACT

A process for producing concentrated fruit extracts from raw fruit is described. The raw fruit, which may be whole or chopped into bits and at various states of ripeness, is mixed with water and the wetted fruit placed in a pressurized heating container such as an autoclave, where the fruit is heated at a predetermined temperature and pressurized at a predetermined pressure for a predetermined period of time so as to extract the fruit. The extracted fruit is then fed to a separator device which separates the extract from the fruit residue. The extract is then concentrated under vacuum to provide a concentrated fruit extract while the residue is discarded.

8 Claims, 2 Drawing Figures

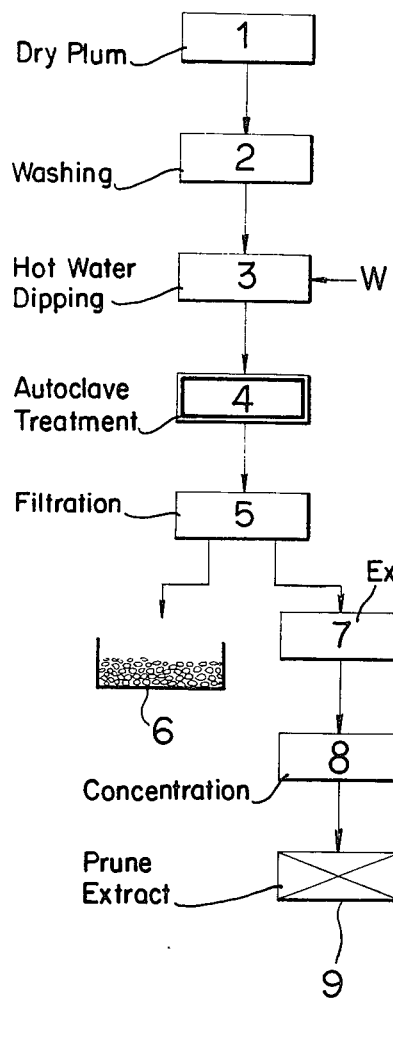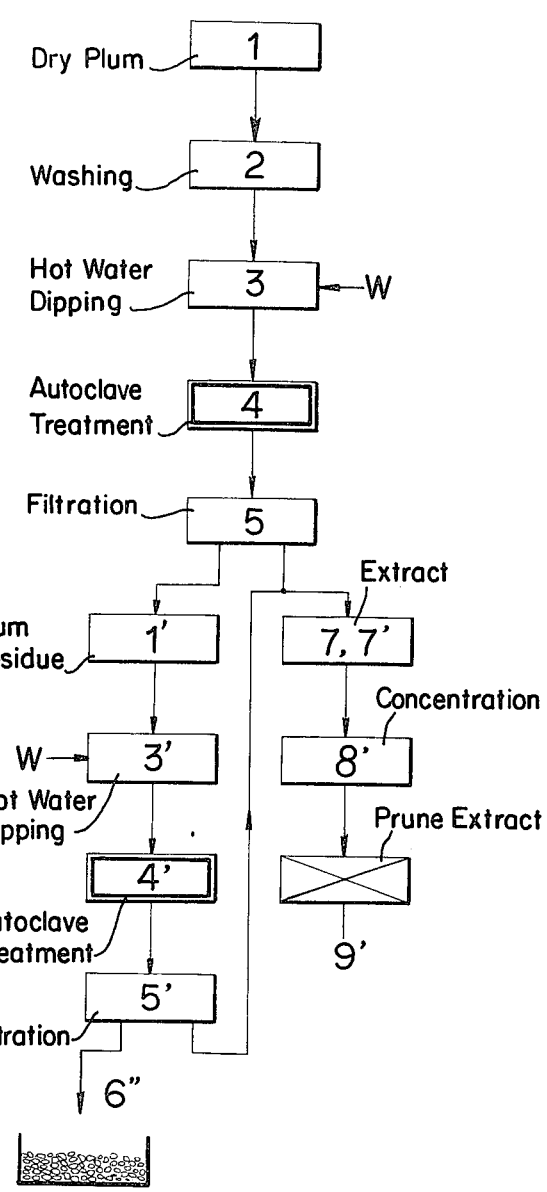

PROCESS FOR PRODUCING FRUIT EXTRACTS

FIELD OF THE INVENTION

The present invention relates to a new process for producing concentrated juices of fruit extracts, so-called fruit extracts such as prune extract obtained by extracting plums and concentrating the resulting extract.

More particularly, it relates to a process for producing fruit extracts wherein a heating step for extraction is followed by a concentration step to obtain the extracts.

BACKGROUND OF THE INVENTION

Heretofore, various processes for producing so-called fruit extracts have been developed and employed, wherein fruits are heated for extraction in the presence of added water to give an extract, which is then concentrated into a juice.

For example, prune extract obtained by extracting plums, particularly dry plums as raw material, and concentrating the resulting extract, has recently been widely marketed and consumed.

Most of the prior art processes for producing prune extract and the like have been generally carried out by first adding water to fruits as the raw material, and cooking this material at atmospheric pressure, and subsequently concentrating the resulting extract; or as a variation of the above process, by continuously feeding steam into fruits dipped in water so as to cook such fruits to thereby obtain a concentrated extract.

However, with such various conventional processes, the time required for the extracting treatment often exceeds several hours and is often of the order of 9 hours. Thus, they have a disadvantage of a very high energy cost. Further, they have the drawback of inefficiency in that with such a long processing time, greater attention from operating personnel is required. Moreover, they have the additional drawback in that treatment without any cover, i.e. so-called open type treatment, usually employed for operational efficiency, causes the hazard of the unhygienic mixing of extraneous matter into the resulting product.

In the case of fruit extracts, it is desired that the extracts be made into a pasty juice through the modification of pectin contained in the fruits as raw material. Also, for increasing the yield and further shortening the extraction time and thereby reducing the energy cost, means for removing seeds, etc. in advance is inherently desired. This however inevitably injures the fruit. As a result, undesirably, the extraction of pectin in view of the injury to the fruit is too rapid and the resulting extract jellifies and forms an extract having a considerably inferior quality to that of the above-mentioned desired product.

The reason for the above undesirable results is that in case of the injured, so-called diced or flaked fruits, their sarcocarp contacts directly with the extraction liquid and the pectin substance readily jellifies in the form of sugar and acid.

Thus, not only the use of the above-mentioned diced or flaked fruits as raw material, but also uninjured fruits, or socalled "whole" fruit, fails to help the situation, and hence there is an inherent drawback in the prior art of a high cost with respect to all types of raw material. Moreover, there is a problem raised with unripe whole fruit. In case of "unripe whole" fruit, unlike the case of "ripe whole" fruit, pectin is yet in the form of protopectin, which combines with calcium and minerals to form a salt, which is integrated with cellulose to maintain a hardness in the form of cells. Thus, there is the danger that in the above-mentioned treatment in hot water, the pectin modification will be insufficient to make the viscosity higher in the form of sugars and acids whereby a jelly is formed. Accordingly, the use of over-ripe whole fruit wherein pectin has been modified into pectinic acid which is water-insoluble and stable, is desirable. However, in dealing with raw material, it is nearly impossible to detect the degree of ripeness of whole fruit, or to screen overripe whole fruit from unripe whole fruit, and even if this may be possible, there occurs a disadvantage in that a high-level screening apparatus is required, resulting in a high cost.

In addition, although ripe fruits contain mainly pectin, they have a disadvantage in that they jellify as well by virtue of the water-soluble property of pectin.

SUMMARY OF THE INVENTION

A first object of the present invention is to provide a new process for producing fruit extracts, having overcome the above-mentioned various drawbacks of the prior art.

A second object of the present invention is to apply heating under pressure onto raw fruit which has heretofore been tabooed in the art and contrary to conventional approaches, thereby providing a new process for producing fruit extracts wherein raw fruit material, irrespective of the extent of the degree of wholeness, amount of dicing and degree of ripeness thereof, is dipped in water to add such water thereto, and heated under pressure in an autoclave to extract the fruit and also carry out the pectin modification in an effective manner, and thereafter the resulting extract is separated from the resulting fruit residue and concentrated, e.g. in vacuo, to obtain a fruit extract.

Further, a third object of the present invention is to provide a new process for producing fruit extracts wherein water is again added to the fruit residue separated in the above process, followed by heating under pressure in an autoclave and separation of the resulting extract from the resulting fruit residue as in the above process, and this extract is combined with the extract obtained in the above process and concentrated together to give a yield (percentage attainment) of substantially 100%.

BRIEF DESCRIPTION OF THE DRAWINGS

FIG. 1 shows a flow sheet of an embodiment of the present invention.

FIG. 2 shows a flow sheet of another embodiment of the present invention.

DESCRIPTION OF PREFERRED EMBODIMENTS

The present invention will be mentioned below in detail referring to embodiments and the accompanying drawing.

As mentioned above, pectin contained in fruits is present in various types, depending on their degree of ripeness and the condition of the fruit, i.e. whole, flaked, diced, etc. Protopectin contained in unripe fruits combines with calcium and minerals and further combines with cellulose to be integrated therewith. As a result, it is converted into pectin in hot water and becomes insoluble and jellifies.

Pectin contained in ripe fruits is also water-insoluble and becomes a cause of jellification. Further, in case of flaked fruit too, pectin substance through the contact of the sarcocarp of fruits with the extraction liquid becomes a cause of jellification.

However, due to the heating under pressure in the presence of added water, the above-mentioned pectin is rapidly hydrolized and a pectin modification occurs rapidly to form water-insoluble pectinic acid, which together with the pectinic acid of overripe whole fruit forms a stabilized pasty extract.

As for the apparatus for the above-mentioned heating under pressure in the presence of added water, it is possible to employ a conventional autoclave which is generally in use.

Next, as an embodiment based upon the above-mentioned theory, a process for producing prune extract having an improved yield will be described, wherein dry plum having a water content of about 20% is employed as raw material.

Referring to FIG. 1, dry plum 1 as raw material in a given amount, e.g. 500 g, is passed through a water-washing step 2 as a pretreatment; the resulting washed dry plum 1 is dipped in a hot water W at 80° C. in an amount of 3 times the volume of the dry plum 1 (step 3), where it is brought into a water-containing state for promoting its hydrolysis; and the resulting contents are introduced into a conventional autoclave 4 in which they are subjected to an action of steam heating under pressure, i.e. under 2 atmospheric pressure, at 121° C. and for 60 minutes to carry out pectin modification and extraction of fruits into extract.

In the above-mentioned step of heating under pressure, pectin modification and extraction of fruits are carried out in the short time mentioned above by virtue of the elevation of the boiling point and the above-mentioned pectin modification, which constitutes the principal mechanism based on which prune extract is obtained.

Further, the making-up of prune extract into paste as the final product is also promoted.

After completion of the extraction through the heating under pressure, the resulting extract and plum residue are taken out of the above-mentioned autoclave, and the plum residue is removed by filtration by means of a sieve of a rough mesh, and further the liquid is passed through a sieve to carry out liquid-solid separation 5. The fruit plum residue is transferred to a container where it is discarded (step 6), while the extract 7 is concentrated in a conventional vacuum concentration step 8, e.g. at 65° C. under 20 mmHg, to give a prune extract 9 with a good yield and a high efficiency (i.e., high percentage attainment).

An example according to the above-mentioned embodiment is shown as follows:

EXAMPLE

Raw material plum: Water content 18%; total weight 500 g

Dipping water: Temperature 80° C. (amount 3 times the volume of raw material)

Treatment in autoclave: 2 atm., 121° C., one hour (steam)

Filtration: Rough mesh and 200 mesh

Concentration: 20 mmHg, 65° C.

Prune Extract: Actual yield, 77.6%; efficiency (percentage attainment based on theoretical yield) 93.3%

A comparison test with a prior art conventional process indicates that with the same raw material the extraction time was 6 hours, with an efficiency (percentage attainment based on theoretical yield) of 71.8%.

Further, the cost required with the conventional process was 234.57 Yen, while that with the example given above was 212.66 Yen.

Next, another embodiment will be described below, referring to FIG. 2.

The steps down to the solid-liquid separation step 5 are carried out in the same manner as in the above-described embodiment shown in FIG. 1. Thereafter, the extraction liquid 7 is transferred to a concentration step 8', while plum 1' separated by filtration is again dipped in hot water at 80° C. in an amount of 3 times the volume of plum 1' to the volume of added water 3'. After a given time, the contents are introduced into an autoclave in which they are subjected to an action of heating under pressure 4' at 121° C. with steam under 2 atm. and for 30 minutes to again carry out pectin modification and extraction of plum 1' by the medium of hydrolysis and elevation of boiling point. Thereafter the resulting material treated is taken out of the autoclave and subjected to solid-liquid separation 5' where filtrations by means of rough mesh and 200 mesh are carried out to give an extract 7'. The resulting residue is transferred to a discarding step 6'', while the extract 7' is combined with the abovementioned extract 7 and the resulting combined extract is concentrated in a vacuum concentration step 8' under 20 mm Hg at 65° C. as in the first embodiment, to give a prune extract 9'.

Of course, as a further embodiment it is also possible to connect the above-mentioned two-step extraction to a three-step extraction and effect a recycle.

An example according to the last described two-step extraction embodiment is as follows: Since the raw material plum, water dipping, filtration and concentration steps are the same as those of the first described example, they are omitted.

EXAMPLE

The first stage autoclave heating under pressure treatment: 2 atm., 121° C., 60 minutes (steam)

The second stage autoclave heating under pressure treatment: 2 atm., 121° C., 30 minutes (steam)

Prune extract: Actual yield, 84.5%; efficiency (percentage attainment based on theoretical yield, 102.0%) (including a measurement error)

As already indicated, with a conventional prior art process, the extraction time was 6 hours; the percentage attainment based on theoretical yield was 71.8%; and the cost required was 234.57 Yen, whereas, according to the last described two-step treatment process of the present invention, the cost required was 183.32 Yen, and hence reduced by 22%.

The prune extract thus obtained is not basically different from that obtained according to the conventional process, in that it is a pasty juice, but a subjective test gave rather positive results as to taste characteristics and the body of the extract.

Further, in the case of prune extract obtained according to conventional processes, since it is difficult to screen overripe fruit and fruit having a high degree of wholeness according to the degree of ripeness thereof, as mentioned above, the percentage modification of pectin is unstable and hence the resulting extract has a latent element of jellifying due to mixing of pectin into pectinic acid. Thus it has often occurred that the viscosity of the extract increases with a lapse of time, and finally after a further time lapse, it hardens and jellifies.

Whereas, according to the examples of the present invention, any of protopectin of unripe fruit, pectin of ripe fruit and pectin of flaked fruit are converted into pectinic acid, since a rapid pectin modification is carried out by the water-addition and the heating under pressure, and they become water-insoluble together with the pectinic acid of overripe fruit. Thus, almost no change with a lapse of time such as jellifying was observed.

Further, as for raw plum material, not only in case of whole, but also even in case where chopped plum, i.e. diced plum, was employed, no change in the quality occurred. Thus, even when flaked plum having seeds removed for elevating the yield was employed, no jellification occurred to give a prune extract having the same quality as that of the extract obtained from whole fruit.

In addition, even when various experiments were carried out with unripe plum, ripe plum and overripe plum, there were no substantial differences between the data obtained from the product tests, as expected from the above-mentioned theoretical analysis.

Further, the above-mentioned embodiments are directed to a process for producing prune extract from plum as raw material, but the pressure, the time, etc. can be varied depending upon fruits to be treated. It goes without saying that the process is also feasible in case of apple, peach or other fruits.

As mentioned above, according to the process of the present invention consisting of the basic steps of adding water to fruits as raw material, thereafter heating them under pressure in an autoclave, and then concentrating the resulting extract, pectin contained in the fruits is converted into stabilized pectinic acid by a rapid pectin modification through hydrolysis, in a short time, irrespective of the degree of ripeness of the fruit and whether the fruit is flaked or whole. Further, a long time extraction step as needed in the conventional cooking process of the prior art can be omitted. Accordingly, the energy cost which accounted for most of the production cost in the production of fruit extracts in the prior art can be reduced to a large extent, due to the short time step of heating under pressure in an autoclave. As a result, there is an effective reduction of the production cost.

Further, according to the conventional prior processes for carrying out the above-mentioned long time cooking, it is necessary to often replace the water. Whereas, according to the process of the present invention, such water replacement and the labor involved therein can be omitted. In this respect, too, there is the advantage of reducing the production cost.

Furthermore, since the extraction in an autoclave is carried out in a tightly closed container, there is no hazard that extraneous matter will enter the contents. Thus, there is an advantage of being very hygienic. Further, autoclave and the other equipment used can be greatly simplified. Thus, there is an advantage in that the initial equipment cost can be reduced.

Still further, the simplification of steps yields a very great advantage, from the point of production control, quality control, operational efficiency, etc.

Further, as mentioned above, pectin modification into stabilized pectinic acid is always effected irrespective of whether the fruit material is whole, flaked, unripe or overripe. Accordingly, a superior product which does not jellify with a lapse of time and also does not change in quality, even after long time storage and storage at low temperatures, can be obtained. Thus, neither screening of raw materials nor designation of specified raw materials are necessary. In this respect, too, the extract can be produced at a very cheap cost, and yet a product having a good quality can be obtained with a stabilized high yield, irrespective of the source. Further, there is the advantage in that controlling the operation can be omitted to a large extent and the yield of product is improved.

What is claimed is:

1. In a process for producing fruit extracts by heating fruit as raw material for extraction, followed by concentrating the resulting extract, the improvement which comprises:
   adding water to fruit as the raw material;
   introducing the resulting mixture into a closed air tight container;
   heating the contents of the container while simultaneously pressurizing said container at about 2 atm. for a given time to extract the fruit;
   separating the resulting extract from the resulting fruit residue; and
   concentrating the thus separated extract to obtain a fruit extract.

2. The improvement according to claim 1 wherein said pressurization is effected by steam.

3. The improvement according to claim 1 wherein the time of heating in the container is about 60 minutes.

4. The improvement according to claim 3 wherein the heating in the container is at a temperature of about 120° C. at a pressure of about 2 atm.

5. The improvement according to claim 4 wherein the extract is concentrated at a pressure of about 20 mm of mercury at a temperature of about 65° C.

6. The improvement according to claim 1 wherein water is added to said fruit residue, the fruit residue is introduced into a second closed container and heated under a predetermined pressure for a predetermined period of time to extract the fruit, the resulting fruit extract is separated from the resulting fruit residue and the fruit extract thus obtained is combined and concentrated with the fruit extract first obtained.

7. The improvement according to claim 6 wherein the fruit residue is heated in the second container for about 30 minutes at about 121° C., under about 2 atm.

8. The improvement of claim 1 wherein the container is an autoclave.

* * * * *